UNITED STATES PATENT OFFICE.

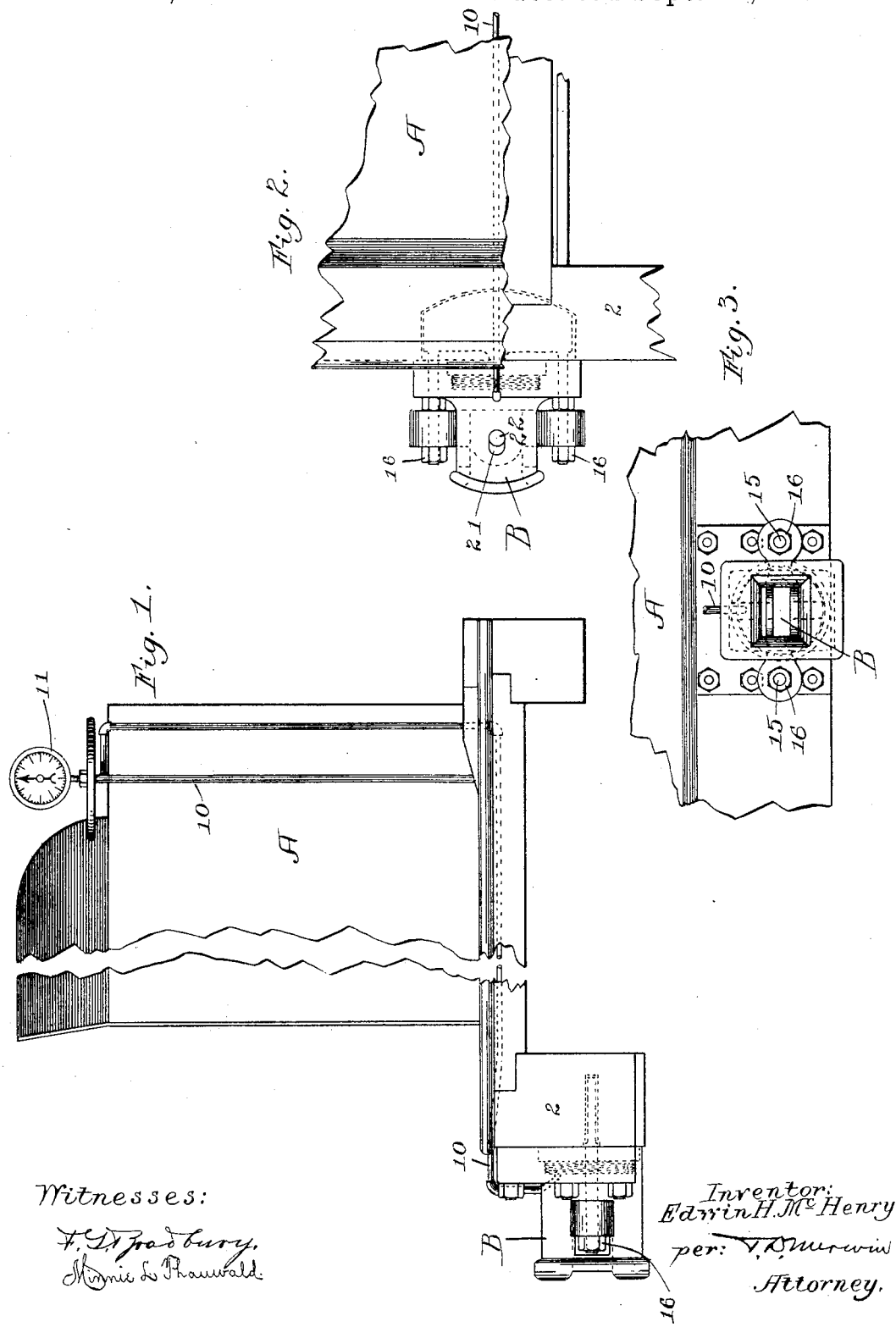

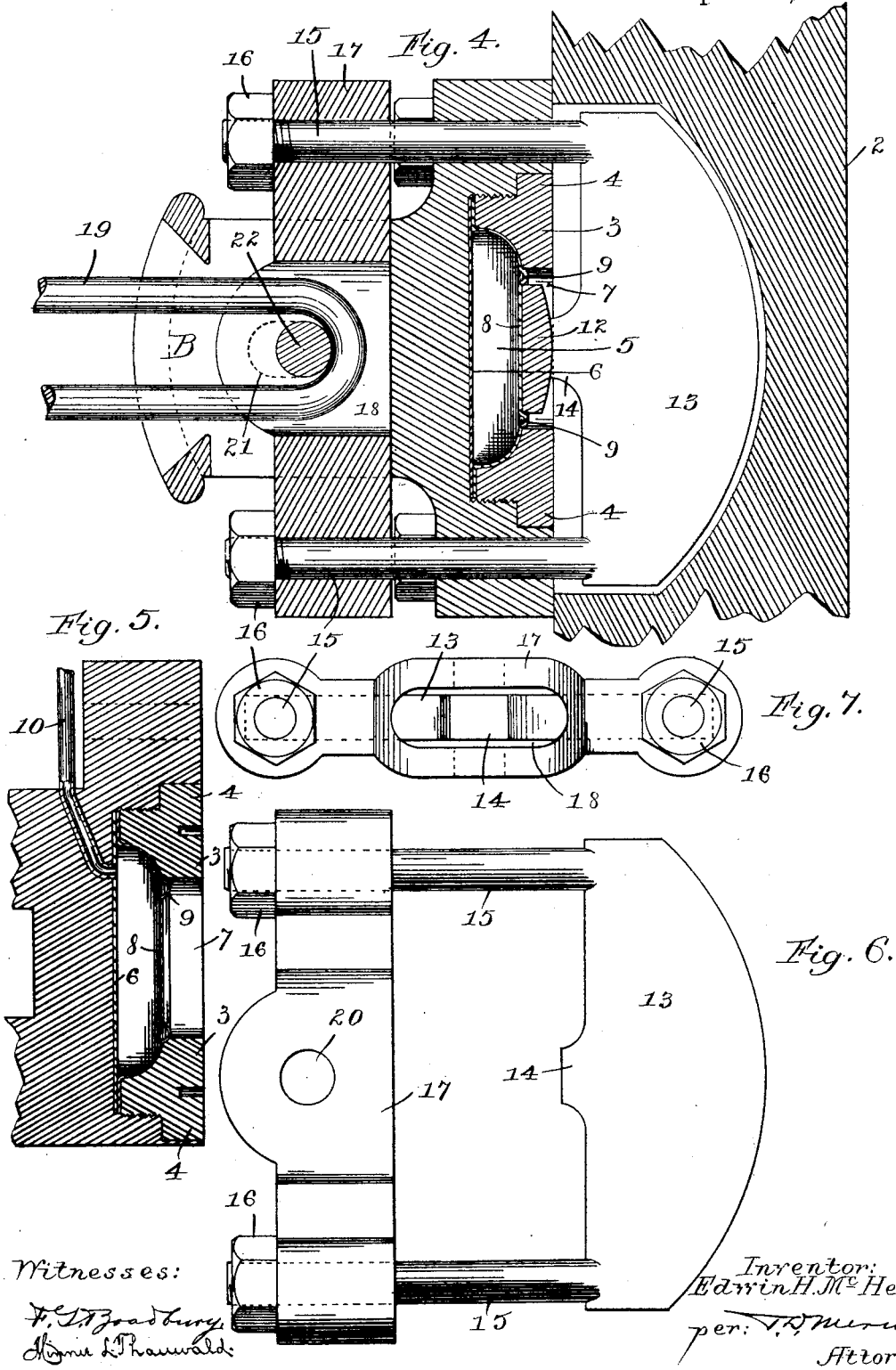

EDWIN H. McHENRY, OF ST. PAUL, MINNESOTA.

DYNAMOMETER.

SPECIFICATION forming part of Letters Patent No. 590,046, dated September 14, 1897.

Application filed January 26, 1894. Serial No. 498,093. (No model.)

*To all whom it may concern:*

Be it known that I, EDWIN H. MCHENRY, of the city of St. Paul, in the county of Ramsey and State of Minnesota, have invented certain new and useful Improvements in Dynamometers; and I do hereby declare the following to be a full, clear, and exact description of the invention, such as will enable others skilled in the art to which it appertains to make and use the same.

My invention relates to improvements in dynamometers, its object being to provide an improved fluid-pressure apparatus for use especially on locomotives and other like vehicles for measuring the tractive power, and also for measuring static pressures, in which the pressure-receiving area is absolutely unvarying, whereby the resultant fluid-pressure always bears the same proportion to the applied load.

To this end my invention consists generally in providing a closed fluid-chamber connected with a suitable indicator or register. This chamber is formed with a thin sheet-metal lining of flexible impervious material to prevent leakage of the fluid when under pressure. A part of the wall of the chamber is cut away to receive the movable bearing or pressure plate working therein, and this opening is closed by the diaphragm of the lining. This diaphragm and pressure-plate are so constructed that the area of the load-receiving surface of the diaphragm and the area of surface of the fluid subject to pressure are unvarying, regardless of the load. To achieve this result, the opening in the wall of the chamber is circular and the pressure-plate has a piston loosely fitted thereto. The diaphragm part of the lining is formed with an exteriorly-projecting annular corrugation, which corrugation is semicircular in cross-section and fitted to the annular space between the pressure-plate and the wall of the opening. The face of the pressure-plate is plane-surfaced and with sharp outline edges, so that the contact area is always the same. The diaphragm is also plane-surfaced for the same area which is coterminous with that included in the annular corrugation. This corrugation serves several purposes, but chiefly to relieve the strain upon the diaphragm caused by the pressure. If the diaphragm were throughout plane-surfaced, any pressure would exert a theoretically infinite strain and cause rupture, whereas the corrugation allows slight movement of the diaphragm without any practical additional strain except that caused by the load. The circularly-curved corrugation is best adapted to resist the strain. It also serves to furnish a pressure-surface upon the contained fluid of exactly the area of the pressure-plate plus the thickness of the diaphragm around the circumference or periphery of the plate.

My invention further consists in the features of construction hereinafter more specifically described and claimed.

In the accompanying drawings, forming part of this specification, Figure 1 represents a side elevation of a locomotive-cab shown fitted with my invention, the intermediate parts of the cab being broken away, so as to bring the figure within proper compass. Fig. 2 is a detail plan view of a draw-head and connected parts. Fig. 3 is a detail end view of the same. Fig. 4 is a detail horizontal section, on an enlarged scale, of the draw-head and my improved attachment fitted thereto. Fig. 5 is a detail central vertical section of the fluid-chamber and surrounding parts. Fig. 6 is a plan view of the draft-yoke, to which the coupling link is connected and which bears upon the pressure-plate; and Fig. 7 is a detail end view of the same.

In the drawings, A represents the engine-cab, to which my device is shown attached.

B is the draw-head, which is suitably connected to the cross-beam 2 and other parts of the frame of the cab by means not shown. The draw-head is chambered out in the rear and screw-threaded to receive the block 3, provided with the annular shoulder 4 to fit it more firmly in place. This block is cut away in its inner face to form the chamber 5. This chamber is provided on all sides with the sheet-metal lining 6, made of brass or other suitable flexible material impervious to the contained fluid.

The block 3 is provided with a cylindrical rear opening 7, which is closed by the lining 6, constituting a diaphragm portion 8. This diaphragm is plane-surfaced, except the part adjacent the wall of the opening 7, where it is formed with an annular outwardly-projecting corrugation 9, which corrugation is semicircular in cross-section. The chamber 5 is connected by the conduit or tube 10 with an indicator or register 11 in the cab. Upon the diaphragm and fitted accurately to the place within the corrugation is a pressure-plate 12, having its face plane-surfaced and with sharp peripheral edges. The yoke 13 has a stud or projection 14, adapted to bear upon the plate 12, and is connected by means of the rods 15 and nuts 16, threaded thereon with the cross-bar 17. This cross-bar has a laterally-extended slotted opening 18 to receive the coupling-link 19 and a vertical hole 20 for the coupling-pin 22. The draw-head pin-hole is longitudinally elongated to form the slot 21, the hole 20 normally registering with the rear end of the hole in the draw-head, but with the movement of the yoke the pin is allowed limited movement in the draw-head before it reaches the other end of the hole, so as to apply tension directly to the head.

The operation of the device is evident from the drawings. The chamber and connected tube is filled with any suitable liquid, such as mineral oil, which will not congeal at any of the temperatures to which it is exposed. The entire load of the attached car or train is applied directly to the confined liquid through the medium of the connecting-link 19, the coupling-pin 22, the cross-beam 17, rods 15, yoke 13, pressure-plate 12, and diaphragm 8. The area of pressure upon the diaphragm and of the diaphragm upon the confined liquid is evidently absolutely unvarying without regard to the load, and the pressure upon the liquid is thus accurately shown by the indicator or register. The slight movement of the pressure-plate and diaphragm is permitted by means of the surrounding corrugation of the diaphragm without undue strain to produce rupture.

Having now fully described my invention, what I claim as new, and desire to secure by Letters Patent, is—

1. In an apparatus of the class described, the combination with the receptacle having an opening in its wall, the flexible diaphragm closing said opening, and the pressure-applying means bearing upon said diaphragm with unvarying pressure area within the limits of the predetermined maximum load.

2. In an apparatus of the class described, the combination of the fluid-pressure chamber having an opening through its side wall, the impervious sheet-metal lining for said chamber closing said opening, and constituting a flexible diaphragm, and the means for applying pressure to said diaphragm with unvarying pressure area within the limits of its maximum load.

3. In a fluid-pressure dynamometer, the combination with the flexible wall or diaphragm bearing upon the confined fluid, of means for applying pressure to said wall or diaphragm with unvarying area of bearing-contact thereon within the limit of maximum load for said apparatus.

4. In an apparatus of the class described, in combination, the chamber having an opening through its wall, the diaphragm covering said opening, and the pressure-plate loosely fitted in said opening and conforming in shape thereto, seated upon a diaphragm, said diaphragm having an exterior corrugation substantially semicircular in cross-section, and fitting into the space between the plate and wall of the opening.

5. In an apparatus of the class described, the combination of the fluid-pressure chamber having a circular opening, the plane-surfaced pressure-plate concentrically placed in said opening, the flexible diaphragm interposed between said chamber and said pressure-plate, and serving as a seat for said plate, the annular indentation or corrugation in said diaphragm closely fitting into the space between the wall of the opening and pressure-plate, and the pressure-indicating mechanism.

6. In an apparatus of the class described, the combination with the fluid-pressure chamber having a circular opening through its wall, of the impervious flexible sheet-metal lining for said chamber closing said opening as a diaphragm, and the plane-surfaced pressure-plate fitting loosely within said opening seated upon said diaphragm.

7. In a fluid-pressure dynamometer, the combination with the fluid-chamber having an opening through its wall, of the flexible diaphragm closing said opening, the pressure-plate arranged in said opening with an intermediate space and seated upon said diaphragm, the diaphragm being formed with an outward bend substantially semicircular in cross-section filling said intermediate space, and said pressure-plate being plane-surfaced and with a sharp circumferential edge.

8. In an apparatus of the class described, the combination with the fluid-pressure chamber, having a circular opening, of the diaphragm bridging said opening, and the plane-surfaced pressure-plate arranged in said opening and seated upon the diaphragm, the diaphragm being formed with an annular outward bend or corrugation fitting in the space between the pressure-plate and wall of the opening.

9. In an apparatus of the class described, in combination with the fluid-pressure chamber having a circular opening, and its pressure-plate, the diaphragm closing the opening in the fluid-pressure chamber and serving as a seat for the pressure-plate and having an outward curve or bend intermediate of the pressure-plate and the wall of the opening.

10. In combination with a railway draw-bar, a coupling-pin, the draw-head having a chamber therein provided with a circular opening, the connected tube and indicator, the impervious sheet-metal lining for said chamber constituting a diaphragm to close said opening, the circular plane-surfaced pressure-plate arranged loosely in said opening and bearing upon said lining with unvarying area of contact within the limits of the predetermined maximum load, and the means for connecting the pressure-plate to the coupling-pin.

11. In combination with a draw-head having a pin-hole therethrough, and the link and pin, of the cross-bar passing through said draw-head and having a pin-hole therethrough, with its front wall slightly in the rear of the front wall in the pin-hole of the draw-head, the yoke connected to said cross-bar, the block interposed between said yoke and cross-bar having fluid-chamber therein with a circular opening through its rear wall, the pressure-indicator connected with said chamber, the impervious, flexible lining for said chamber, closing said opening, and the pressure-plate carried by said yoke and bearing upon said lining with unvarying contact area.

In testimony whereof I have signed this specification in the presence of two subscribing witnesses.

EDWIN H. McHENRY.

Witnesses:
ARTHUR W. DE ROCHER,
MARGARET C. SCANLON.